(12) United States Patent
Saini et al.

(10) Patent No.: US 11,866,645 B1
(45) Date of Patent: Jan. 9, 2024

(54) METHODS FOR HYDRAULIC FRACTURING AND FLOWBACK FLUID COMPOSITIONS SUITABLE FOR SUCH

(71) Applicant: Saudi Arabian Oil Company, Dhahran (SA)

(72) Inventors: Rajesh Kumar Saini, Cypress, TX (US); Hasmukh A. Patel, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/819,772

(22) Filed: Aug. 15, 2022

(51) Int. Cl.
  *C09K 8/68* (2006.01)
  *E21B 43/26* (2006.01)
  *C09K 8/66* (2006.01)
  *C09K 8/60* (2006.01)

(52) U.S. Cl.
  CPC .............. *C09K 8/68* (2013.01); *C09K 8/604* (2013.01); *C09K 8/665* (2013.01); *E21B 43/26* (2013.01); *C09K 2208/10* (2013.01)

(58) Field of Classification Search
  None
  See application file for complete search history.

(56) References Cited

U.S. PATENT DOCUMENTS

| | | | |
|---|---|---|---|
| 2019/0169492 A1* | 6/2019 | Hill | C09K 8/602 |
| 2019/0194526 A1* | 6/2019 | Holtsclaw | C09K 8/06 |
| 2020/0071591 A1 | 3/2020 | Patel et al. | |
| 2021/0222059 A1 | 7/2021 | Southwell et al. | |

FOREIGN PATENT DOCUMENTS

WO 2012138454 A1 10/2012

OTHER PUBLICATIONS

Bocchini et al., "One-pot synthesis of hexadecyl modified layered magnesium silicate and polyethylene based nanocomposite preparation", Applied Clay Science, vol. 80-81, pp. 320-325, 2013.

(Continued)

*Primary Examiner* — Andrew Sue-Ako
(74) *Attorney, Agent, or Firm* — DINSMORE & SHOHL LLP

(57) ABSTRACT

This disclosure relates to methods of hydraulic fracturing that may include passing a fracturing fluid through a wellbore into a subterranean formation, wherein the fracturing fluid comprises a flowback enhancer composition in an amount of from 0.10 gallon per 1000 gallons of fluid (gpt) to 10 gpt based on the total volume of fracturing fluid, hydraulically fracturing the subterranean formation with the fracturing fluid, at least partially separating the fracturing fluid from the hydrocarbons to yield a recovered fracturing fluid. The flowback enhancer composition can include a solvent mixture comprising an aqueous solution, at least one unsaturated ester, and at least one alcohol; a surfactant mixture comprising at least one secondary alcohol ethoxylate and at least one castor oil ethoxylate; and one or more particles having a widest length of from 1 nanometer to 200 nanometers.

15 Claims, 8 Drawing Sheets

(56) References Cited

OTHER PUBLICATIONS

Moura et al., "Comparative Adsorption of CO2 by Mono-, Di-, and Triamino-Organofunctionalized Magnesium Phyllosilicates", Environmental Science and Technology, vol. 47, pp. 12201-12210, 2013.

Patel et al., "Synthetic talc as a solid base catalyst for condensation of aldehydes and ketones", Journal of Molecular Catalysis A: Chemical, vol. 286, pp. 31-40, 2008.

Patel et al., "Organically modified layered magnesium silicates to improve rheology of reservoir drilling fluids", Scientific Reports, vol. 10, Article No. 13851, 2020.

* cited by examiner

METHODS FOR HYDRAULIC FRACTURING AND FLOWBACK FLUID COMPOSITIONS SUITABLE FOR SUCH

FIELD

Embodiments disclosed herein generally relate to hydraulic fracturing, and more specifically to enhancing flowback of fracturing fluid during stimulation operations.

TECHNICAL BACKGROUND

Hydraulic fracturing uses fluid and materials to generate fractures in a geological formation and stimulate production of oil and gas from wells. Hydraulic fracturing is a well-stimulation technique in which rock is fractured by a pressurized fluid that may include a fracturing fluid. The hydraulic fracturing process may involve the hydraulic pressure of fracturing fluid into a wellbore to initiate and propagate fracture in the deep-rock formations where proppants may be placed through in which oil, gas, water and pumped fluids will flow more freely. After fracturing, conductive paths are generated and may increase the rate at which production fluids, such as crude oil or natural gas, can be produced from the reservoir formations. The fracturing fluid may be recovered.

SUMMARY

The composition of the fracturing fluid may influence the amount of fracturing fluid that may be recovered from a wellbore. An ongoing need exists for methods for hydraulic fracturing and compositions for improving the recovery of fracturing fluid from wellbore stimulation operations. As is described herein, fracturing fluids that include particles having a widest length of from 1 nanometer to 200 nanometers. The use of such particles in fracturing fluids may improve the flowback, thus lowering overall costs and increasing efficiencies in hydraulic fracturing.

According to one or more embodiments, a method of hydraulic fracturing can comprise: passing a fracturing fluid through a wellbore into a subterranean formation, wherein the fracturing fluid comprises a flowback enhancer composition in an amount of from 0.10 gallon per 1000 gallons of fluid (gpt) to 10 gpt based on the total volume of fracturing fluid; hydraulically fracturing the subterranean formation with the fracturing fluid, thereby generating fractures in the subterranean formation; passing the fracturing fluid to a surface of the well, wherein the fracturing fluid is mixed with hydrocarbons; and at least partially separating the fracturing fluid from the hydrocarbons to yield a recovered fracturing fluid. The flowback enhancer composition can comprise a solvent mixture comprising an aqueous solution, at least one unsaturated ester, and at least one alcohol; a surfactant mixture comprising at least one secondary alcohol ethoxylate and at least one castor oil ethoxylate, wherein the fracturing fluid comprise from 0.0005 gpt to 4 gpt of the surfactant mixture; and one or more particles having a widest length of from 1 nanometer to 200 nanometers, wherein the fracturing fluid comprises from 0.002 gpt to 3 gpt of the one or more particles having a widest length of from 1 nanometer to 200 nanometers.

According to one or more additional embodiments, a flowback enhancer composition can comprise a solvent mixture comprising an aqueous solution, at least methyl-9-dodecenoate, and at least isopropanol; a surfactant mixture comprising at least dodecylbenzene sulfonic acid and a castor oil ethoxylate; and one or more particles having a widest length of from 1 nanometer to 200 nanometers.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

Reference will now be made in greater detail to various embodiments, some embodiments of which are illustrated in the accompanying drawings.

DETAILED DESCRIPTION

Embodiments disclosed herein include flowback enhancer compositions. More specifically, some embodiments disclosed herein are directed to methods of hydraulic fracturing that include flowback enhancer compositions. In embodiments, a flowback enhancer composition may be combined with fracturing fluid, which may significantly reduce capillary pressure of the fracturing fluid, improving the recovery of fracturing fluid. Increased recovery of the fracturing fluids in wells may lead to lower water saturation in the formation, which may reduce damage to the formation due to the swelling of clays present in the well. By reducing damage to the formation, the rate of production of oil and gas from the well may be improved.

Figure 1:
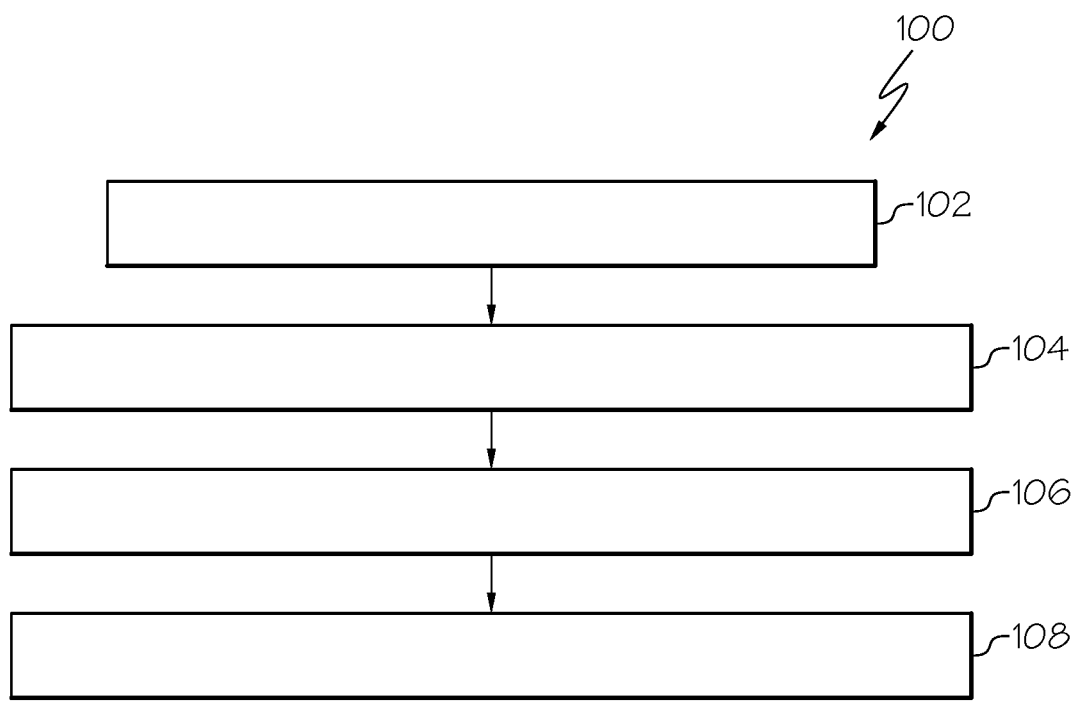
FIG. 1 is a flowchart of a method, according to one or more embodiments described herein.

Turning now to FIG. 1, a method 100 of hydraulic fracturing a subterranean formation, including a flowback enhancer composition in the fracturing fluid, is depicted. The subterranean formation may also be referred to as a geological formation, reservoir formation, reservoir, rock formation, hydrocarbon formation, and the like. A hydraulic fracturing system may be disposed at a surface near or adjacent a wellbore in the subterranean formation. The hydraulic fracturing system may include a source, e.g., including vessel(s), of fracturing fluid. The hydraulic fracturing system may also include a source of flowback enhancer composition. In implementations, the flowback enhancer composition may comprise one or more particles having a widest length of 1 nanometer (nm) to 200 nm.

At block 102, the method includes passing (e.g., pumping) the fracturing fluid through the wellbore into the subterranean formation. The fracturing fluid may be pumped from the surface. A flowback enhancer composition may be added to the fracturing fluid at the surface. The wellbore may be a cased wellbore having perforations for flow of the fracturing fluid (with and without flowback enhancer compositions) into the subterranean formation. The fracturing fluid may be, for example, foam fracturing fluid, non-foam fracturing fluid, such as viscoelastic surfactant (VES)-based fracturing fluid, emulsion fracturing fluid, oil-based fracturing fluid, and other types of fracturing fluid.

At block 104, the method includes hydraulically fracturing the subterranean formation with the fracturing fluid, thereby generating fractures in the subterranean formation. In particular, the injection of the fracturing fluid by the pump through wellbore perforations into the subterranean formation may hydraulically fracture the subterranean formation. In embodiments, the fracturing fluid may be pumped downhole at a pump rate of 60 bbl to 120 bbl per minute. The fracturing fluid may include additives, such as a viscosifier, friction reducer, clay inhibitor, buffer, scale inhibitor, flowback enhancer, corrosion inhibitor, oxidizer breaker, or fluid loss agent, or any combinations of these. The fluid may include suspending agent such as fibers of degradable materials, degradable materials, and tackifying agents. As used throughout, "viscosifier," "viscosity modifier," and "rheological modifier" may refer to compounds that change rheological properties when added to a fluid. Viscosifiers may be used to increase the viscosity of a fluid.

The fracturing fluid may have a friction reducer to decrease friction experienced in the pumping of the fracturing fluid through the wellbore into the subterranean formation. The friction reducer may be, for example, an anionic copolymer. The viscosifier (for example, a polysaccharide) increases viscosity of the fracturing fluid. One example of polysaccharide as a viscosifier is guar or guar gum, which is a galactomannan polysaccharide. For multi-phase fracturing fluid, the viscosifier and friction reducer may generally reside in the aqueous phase in implementations.

At block 106, the method includes passing the fracturing fluid to the surface of the well. In particular, at least a portion of the fracturing fluid that is used to fracture the subterranean formation may flow back from the subterranean formation to the surface of the well after fracturing the formation and putting the well on production. In embodiments, the fracturing fluid may be mixed with hydrocarbons produced from the well to form a mixture. The mixture comprising the fracturing fluid may pass to the surface of the well. The mixture of the fracturing fluid and hydrocarbons may be further processed.

At block 108, the method includes at least partially separating the fracturing fluid from the hydrocarbons after the mixture comprising the fracturing fluid and hydrocarbons is passed to the surface of the well. In embodiments, conventional methods known in the art may be used to separate the fracturing fluid from the hydrocarbons, such as but not limited to, oil-water or oil-gas separators. In embodiments where an emulsion is formed, a deemulsifier can be used to separate water from oil or condensate. After the fracturing fluid is separated from the hydrocarbons, the fracturing fluid may be recovered, that is, at least a portion of the fracturing fluid that passed through the wellbore into the subterranean formation is returned to the surface of the wellbore and at least partially separated from the hydrocarbons to yield a recovered fracturing fluid.

The presence of the flowback enhancer composition in the fracturing fluid may increase an amount of the recovered fracturing fluid. Without intending to be bound by any particular theory, it is believed that the flowback enhancer composition may reduce the capillary pressure of the fracturing fluid in the fractures. Further, it is believed that the flowback enhancer composition may reduce the surface tension and/or interfacial tension of water in the fracturing fluid, which may increase an amount of the recovered fracturing fluid in comparison to the recovered fracturing fluid in methods where the fracturing fluid does not comprise the flowback enhancer composition. In embodiments, the flowback enhancer composition may increase the contact angle of the formation by changing the wettability of the formation to a more neutral wet condition, that is, a contact angle closer to 90°. Without being bound by any particular theory, it is believed that an increase in the contact angle of the formation may lower capillary pressure and, in turn, reduce fluid trapping in the formation. An increase of the contact angle to closer to 90° can allow for both oil and water to pass through pores of the formation more easily than if the contact angle was further from 90°. Reduced fluid trapping may result in increased fracturing fluid recovery. Further, it is believed that the emulsion formed by the flowback enhancer composition may result in smaller droplet sizes of the emulsion, which may have a lower surface tension and penetrate deeper into the formation.

In embodiments, increased recovery of the fracturing fluids in wells may lead to lower water saturation in the formation, which may reduce damage to the formation due to the swelling of clays present in the well. Further, by reducing damage to the formation, a rate of production of oil and gas from the well may be improved.

In embodiments, the method may include passing a hydrocarbon stream in the subterranean formation to the surface of the well. In embodiments, upon hydraulically fracturing the subterranean formation, the hydrocarbon stream may be passed to the surface of the well at a faster rate, in comparison to methods that do not include hydraulically fracturing the subterranean formation. Further, in embodiments, the flowback enhancer composition may increase a rate of production of the hydrocarbon stream, in comparison to methods that do not include the flowback enhancer composition. The rate of production of the hydrocarbon stream can be measured using any methods known in the art, such as quantifying a rate of hydrocarbons passed to the surface of the well.

As described herein, the fracturing fluid may comprise a flowback enhancer composition. In embodiments, the flowback enhancer composition may comprise a solvent mixture, a surfactant mixture, and one or more particles having a widest length of from 1 nanometer to 200 nanometers.

In embodiments, the solvent mixture may comprise an aqueous solution. The aqueous solution may include one or more of deionized, tap, distilled, or fresh waters. In one or more embodiments, the aqueous solution may comprise at least 80 wt. %, at least 90 wt. %, at least 95 wt. %, at least 99 wt. %, at least 99.9 wt. % or even 100 wt. % of water.

In some embodiments, the solvent mixture may include additional solvents that are insoluble in an aqueous solution. Such insoluble solvents may include kerosene, diesel, terpenes, liquid esters, unsaturated esters, xylene, ethylbenzene, toluenes, unsaturated aliphatic hydrocarbons, cyclic hydrocarbons, or combinations thereof. In embodiments, the solvent mixture may also comprise d-limonene, dipentene, ethyl lactate, fatty acid methyl esters, soy methyl esters, natural terpenes, hexyl esters, or combinations thereof. In embodiments, the solvents in the solvent mixture may be cyclic, alicyclic, branched, linear, or a combination of two or more thereof.

In embodiments, the solvent mixture may comprise at least one unsaturated ester. Non-limiting examples of unsaturated esters may include soy methyl ester, methyl laurate, dibasic ester (mixture of dimethyl glutarate, dimethyl succinate and dimethyl adipate), methyl-9-dodecenoate, methyl caprylate]. In embodiments, the solvent mixture may comprise methyl-9-dodecenoate.

In embodiments, the solvent mixture may comprise at least one alcohol. In embodiments, the at least one alcohol can be selected from the group consisting of methanol, ethanol, butanol, isopropanol, n-hexanol, ethylene glycol, propylene glycol, polyethylene glycol, triethylene glycol, diethylene glycol monomethyl ether, 2-ethylhexanol, or combinations thereof. In embodiments, the solvent mixture may comprise methanol, ethanol, butanol, isopropanol, n-hexanol, ethylene glycol, propylene glycol, polyethylene glycol, triethylene glycol, diethylene glycol monomethyl ether, 2-ethylhexanol, or combinations thereof. In embodiments, the solvent mixture can comprise isopropanol, triethylene glycol, or a combination thereof.

In embodiments, the flowback enhancer composition may comprise a surfactant mixture. In embodiments, the surfactant mixture may include one or more surfactants. The surfactants may be anionic, non-ionic, amphoteric, or combinations thereof. The hydrophilic-lipophilic balance (HLB) of the surfactants may be from 6 to 18. Without intending to be bound by any particular theory, it is believed that selection of surfactants with an HLB from 6 to 18 may result in the flowback enhancer composition forming an oil-in-water emulsion.

In embodiments, the surfactant mixture may comprise ethoxylated esters, such as polysorbate 60 and polysorbate 80, linear ethoxylates with an ethoxylated ester having an ethylene oxide chain of 7 to 30 units, alkyl ether sulfate, dodecylbenzene sulfonic acid, castor oil ethoxylate, sorbiton monopalmatate, or combinations thereof. In embodiments, the surfactant mixture may comprise at least one secondary alcohol ethoxylate. In embodiments, the surfactant mixture may comprise at least one castor oil ethoxylate. In embodiments, the surfactant mixture may comprise dodecylbenzene sulfonic acid.

In embodiments, the surfactant mixture may further comprise at least one modified quaternary imidazoline. Non-limiting examples of modified quaternary imidazolines include tallow hydroxyethyl imidazoline, oleyl hydroxyethyl imidazoline, tallow hydroxyethyl imidazoline, oleyl hydroxyethyl imidazoline, tallow amidoethyl imidazoline, oleyl amidoethyl imidazoline. Exemplary commercially available modified quaternary imidazolines include Quatrex 172 from Lubrizol and Armohib C1-209 from Nouryon. In embodiments, the modified quaternary imidazoline can be prepared with other alkyl chains, such as but not limited to hydrogenated tallow, stearyl, and coco alkyl.

In embodiments, the surfactant mixture may comprise one or more poloxamers. As used herein, the term "poloxamer" may refer to a triblock copolymer comprising a central hydrophobic chain of poly(propylene oxide) and two hydrophilic chains of poly(ethylene oxide).

In embodiments, the poloxamer may comprise a compound of formula (I):

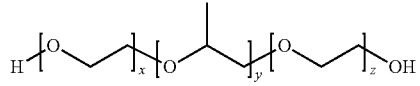

in which x, y, and z are each independently an integer that indicate a number of repeat units present in the compound. In embodiments, the poloxamer may have a hydrophilic-lipophilic balance (HLB) of from 6 to 18. Without being bound by any particular theory, it is believed that the triblock structure comprising the central hydrophobic chain and two hydrophilic chains of the poloxamer may result in a water soluble compound that may be dissolved in a surfactant mixture to form the flowback enhancer composition.

In embodiments, x and z each may independently be an integer from 2 to 130. For instance, in one or more embodiments, x and z each may independently be an integer from 2 to 100, from 2 to 50, from 2 to 25, or from 2 to 15. In embodiments, y may be an integer from 15 to 67. For instance, in one or more embodiments, y may be an integer from 15 to 50, from 15 to 40, from 25 to 67, from 25 to 50, from 25 to 40, or from 25 to 35.

In embodiments, the poloxamer may comprise a triblock copolymer comprising a central hydrophobic block of polypropylene glycol with an average block length of 30 repeat units positioned between two hydrophilic blocks of polyethylene glycol, wherein each of the two hydrophilic blocks of polyethylene glycol have an average block length of 13 repeat units. An exemplary compound is Pluronic™ L-64, a commercially available material from BASF.

In embodiments, the flowback enhancer composition may comprise one or more particles. As used throughout the disclosure, one or more "particles" refer to bodies that may comprise metals or metal compounds, or other materials. The metals may include but are not limited to, calcium, iron, aluminum, titanium, cadmium, zinc, indium, lead, silicon, magnesium, gold, silver, platinum, zirconium. The metal compounds may include but are not limited to, metal oxides, metal hydroxides, metal sulfides, metal carbonates, metal silicates, metal nitrides, metal selenides, metal carbides, metal tellurides or metal phosphates. The one or more particles may comprise a plurality of metal compounds, such as silica, magnesium silicate, or combinations thereof.

In embodiments, the one or more particles may have a widest length ranging from 1 nm to 200 nm. For example, the one or more particles may have an widest length of from 1 nm to 50 nm, from 1 nm to 100 nm, from 1 nm to 150 nm, from 1 nm to 200 nm, from 10 nm to 50 nm, from 10 nm to 100 nm, from 10 nm to 150 nm, from 10 nm to 200 nm, from 50 nm to 100 nm, from 50 nm to 150 nm, from 50 nm to 200 nm, from 100 nm to 150 nm, from 100 nm to 200 nm, or from 150 nm to 200 nm. The maximum length may be determined using electron microscopy, such as but not limited to, transmission electron microscopy or scanning electron microscopy, to measure the maximum length of individual particles in a sample and averaging the maximum length of the individual particles. In embodiments, the one or more particles may comprise silica, alumina, zirconia, clay, carbon, single-wall nanotubes, nanodiamonds, layered magnesium silicate, or combinations thereof. In embodiments, the particles may comprise silica, layered magnesium silicate, or combinations thereof. In other embodiments, the one or more particles is a layered magnesium silicate.

In embodiments, the flowback enhancer composition may comprise layered magnesium silicates comprising a first silicate layer, a layer comprising magnesium, and a second silicate layer. In embodiments, the layer comprising magnesium may be positioned between the first silicate layer and the second silicate layer.

In embodiments, the flowback enhancer composition may optionally comprise one or more salts. The salts may include monovalent salts of alkali metals such as, but not limited to, NaCl, KCl, CaCl$_2$), and MgCl. Addition of one more salts to the flowback enhancer composition may increase a stability of the emulsion formed in producing the flowback enhancer composition. The addition of one more salts to the flowback enhancer composition may lower a freezing point of the flowback enhancer composition.

As described herein, the particles may comprise layered magnesium silicate. Methods of producing a layered magnesium silicate will now be described. For example, the methodology of synthesizing the layered magnesium silicate may be summarized by the following reaction (1), where LMS represents the layered magnesium silicate, in shorthand:

$$MgXW + GYSi(Z)_3 \rightarrow LMS \quad (EQ. 1)$$

where X may include Cl$_2$, Br$_2$, I$_2$, (OH)$_2$, O, formates, citrates, or combinations; W may include water molecules and hydrates, G may include primary amines, secondary amines, tertiary amines, hydroxyl, epoxies, thiols, phenols, aminobenzenes, carboxylates, and combinations of these groups, Y may include ethyl, propyl, ethylene, diamine, diethylene thiamine, triethylene tetramine, phenyl, or combinations; and Z may include methoxy, ethoxy, hydroxyl, ethanol, isopropyl alcohol, glycol, ethylene glycol, or combinations. In embodiments, the reaction may take place in alkalis including, for example, sodium hydroxide, potassium hydroxide, or combinations; alcohols including, for example, methanol, ethanol, isopropyl alcohol, glycol, ethylene glycol, or combinations.

In embodiments of the presently-described methods, the layered magnesium silicates may be reproduced resulting in consistent composition from batch to batch. Consistent and reproducible results may be an advantage over other naturally-derived additives, such as organoclays or organically modified layered materials, which are subject to the impurities in the natural source. Additionally, the presently-described methods may be manipulated to produce certain results in the product, such as changing the crystallinity. Advantageously, the layered magnesium silicates provide consistency for the duration of an application and reduce or eliminate the need for additional additives in fluid formulations during use and application.

In embodiments, an amount of the magnesium salt may be mixed with a reaction medium to produce a magnesium containing reaction mixture. Any reaction medium suitable for suspending a metal oxide or metal hydroxide reaction can be used. The reaction medium may include water, an alcohol, or combinations of the same. Examples of the alcohol may include methanol, ethanol, propanol, butanol, and combinations. The amount of magnesium salt may be in the range from about 3 wt. % to about 15 wt. % based on the total weight of the magnesium containing reaction medium. In other embodiments, the amount of magnesium salt may be in the range from about 3 wt. % to about 10 wt. %, from about 3 wt. % to about 5 wt. %, from about 5 wt. % to about 15 wt. %, from about 5 wt. % to about 10 wt. %, or from about 10 wt. % to about 15 based on the total weight of the magnesium containing reaction medium.

An amount of at least one silane may be added to the magnesium-containing reaction medium to produce a reactant mix. In embodiments, the amount of the at least one silane added may have a combined weight from about 3 wt. % to about 15 wt. % based on the total weight of the reactant mix. In other embodiments, the amount of the at least one silane may be a combined weight from about 3 wt. % to about 10 wt. %, from about 3 wt. % to about 5 wt. %, from about 5 wt. % to about 15 wt. %, from about 5 wt. % to about 10 wt. %, or from about 10 wt. % to about 15 based on the total weight of the reactant mix. The combined amount of the at least one silane added may be determined to maintain a silicone to magnesium molar ratio in the layered magnesium silicate of between about 0.7:1 to 1.5:1, or from 1:1 to about 1.4:1. In at least one embodiment, the combined amount of the at least one silane added results in a silicone to magnesium molar ratio in the layered magnesium silicate of 1.33:1. As used throughout, "silane" may refer to a silicon compound containing at least three alkoxy groups (an alkyl group bonded to oxygen), where the 4th substituent includes a functional group and may be a fourth alkoxy group or may be a carbon containing compound.

It is believed that adding the amount of the at least one silane to the magnesium-containing reaction medium may be important in producing a layered magnesium silicate having the layered structure. In some embodiments, a change in the order of mixing, such as by adding the magnesium salt to the at least one silane may produce amorphous materials that do not possess the layered structure of the presently-disclosed layered magnesium silicate.

An amount of aqueous hydroxide may be added to the reactant mix to produce the reaction mixture. In embodiments, the formation of the layer of octahedral brucite may begin upon addition of the aqueous hydroxide. As used throughout, "octahedral" may refer to the crystal pattern defining an octahedron, with eight triangular faces, twelve straight edges, and six vertices. As used throughout, "brucite" may refer to a magnesium having monomeric formula MgO(OH)$_2$. Hydrolysis of the at least one silane may begin upon addition of the aqueous hydroxide. In some embodiments, the aqueous hydroxide is sodium hydroxide. The aqueous hydroxide may adjust the pH of the reactant mix. The aqueous hydroxide may be added to the reactant mix to reach a target pH. In embodiments, the target pH may be from about 7 to about 12. In some embodiments, the target pH may be from about 9 to about 10. In further embodiments, the aqueous hydroxide is added while stirring. In further embodiments, the aqueous hydroxide is added while stirring for about 30 minutes.

In embodiments, each of the addition steps may be performed at a temperature in the range of from about 10 degrees Celsius (° C.) to about 35° C. In some embodiments, the addition steps may be performed at a temperature of from about 20° C. to about 30° C. In some embodiments, each of the addition steps may be performed at ambient pressure. Each addition step may be followed by a period of mixing.

The reaction mixture may be prepared in one reaction vessel. In some embodiments, the reaction vessel may be fitted with a stirring mechanism such that the mixture is constantly stirred during the addition steps. In some embodiments, the reaction vessel may be fitted with a condenser. In some embodiments, the reaction vessel may be configured for hydrothermal reaction, where the reaction mixture may be maintained at a pressure at the reflux conditions.

The reaction mixture may be mixed for a mixing period. In embodiments, the mixing period may be for at least 30 minutes or at least one hour. In some embodiments, the mixing period may be from about 30 minutes to about 72 hours, from about 4 to about 72 hours, from about 12 hours to a about 72 hours, or from about 24 hours to about 48 hours. Mixing the reaction mixture under an alkaline condition may enable the formation of brucite and the subsequent hydrolysis of the silanes.

Following the mixing period, the reaction mixture may be refluxed in the reaction vessel for a reflux period to produce the product mix. The reflux period may be at least 2 hours. In some embodiments, the reflux period may be from about 2 hours to about 1 week (168 hours), from about 2 hours to about 144 hours, from about 2 hours to about 120 hours, from about 2 hours to about 96 hours, from about 2 hours to about 72 hours, from about 2 hours to about 48 hours, or from about 2 hours to about 24 hours.

During the reflux period, the temperature in the reaction vessel may be increased to the refluxing condition. The refluxing condition may be the boiling point of the reaction mixture and may be from about 25° C. to about 110° C. In some embodiments, the refluxing condition may be from about 25° C. to about 100° C., from about 25° C. to about 75° C., from about 25° C. to about 50° C., from about 50° C. to about 110° C., from about 50° C. to about 100° C., from about 50° C. to about 75° C., from about 75° C. to about 110° C., from about 75° C. to about 100° C., or from about 100° C. to about 110° C. The condensation reactions of the at least one silane may begin when the temperature in the reaction mixture is increased to the refluxing condition. The refluxing condition may allow for the one or more silanes to react to form the tetrahedral silicate layer having mixed functionalities on either side of the layer of octahedral brucite, resulting in the layered magnesium silicate. As used throughout, "tetrahedral" may refer to the crystal pattern defining a tetrahedron, with four triangular faces, six straight edges, and four vertices. The condensation reactions of the silanes continues for the reflux period. The functionalized silicate layers form on the layer of octahedral brucite during the reflux period. Without being bound by theory, it is believed that the reflux conditions may improve the crystallinity of the functionalized silicate layers. In embodiments, the length of the reflux period may influence the crystallinity of the layered magnesium silicates. In some embodiments, a longer reflux period may result in an increased lateral dimension. A hydrothermal reaction during the reflux period may allow crystallization and growth in the lateral dimension.

Following the refluxing step, the product mix may be subjected to one or more treatment operations to separate the solid layered magnesium silicates from the liquids in the product mix to produce the layered magnesium silicate. The treatment operations may include reducing the temperature of the product mix, separating the solids, washing the solids, and drying the solids under vacuum. Separating the solids may be performed through filtration or through centrifuging. The separated solids may be washed with de-ionized water. In some embodiments, the product mix may be washed with deionized water more than once, for example, three times. In some embodiments, drying the solids under vacuum may be done at elevated temperatures or at room temperature. In embodiments, the product mix is dried at a temperature of at least 50° C., at least 60° C., at least 70° C., or at least 80° C. In other embodiments, the layered magnesium silicate may be added to the flowback enhancer composition without additional separation and purification steps.

In embodiments, the layered magnesium silicates may have a widest length from 1 nm to 200 nm. For example, the layered magnesium silicates may have a widest length from 1 nm to 50 nm, from 1 nm to 100 nm, from 1 nm to 150 nm, from 1 nm to 200 nm, from 10 nm to 50 nm, from 10 nm to 100 nm, from 10 nm to 150 nm, from 10 nm to 200 nm, from 50 nm to 100 nm, from 50 nm to 150 nm, from 50 nm to 200 nm, from 100 nm to 150 nm, from 100 nm to 200 nm, or from 150 nm to 200 nm.

Methods of forming the flowback enhancer composition will now be discussed. In embodiments, the solvent mixture, surfactant mixture, and one or more particles may be combined to form the flowback enhancer composition. In embodiments, individual components of both the solvent mixture and surfactant mixture may be combined in any order. For example, in embodiments, the flowback enhancer composition may be formed by adding the following chemicals in order as follows: water, alcohol, surfactant, solvent, particles, followed by mixing to form a flowback enhancer composition precursor. In other embodiments, the mixture can be mixed after each successive addition. In even other embodiments, the water, alcohol, surfactant, and solvent can be mixed, followed by adding particles to the mixture. An additional solvent, such as an unsaturated ester solvent may then be added to the flowback enhancer composition precursor to form the flowback enhancer composition. In embodiments, the flowback enhancer composition may be an oil-in-water emulsion. In other embodiments, the mixture of water, alcohol, surfactant, and solvent can be added to a fracturing fluid and the particles can be separately added to the fracturing fluid.

In embodiments, the flowback enhancer composition may comprise from 20 weight percent (wt. %) to 75 wt. % water. For example, the flowback enhancer composition may comprise from 20 wt. % to 40 wt. %, from 20 wt. % to 60 wt. %, from 20 wt. % to 75 wt. %, from 30 wt. % to 40 wt. %, from 30 wt. % to 60 wt. %, from 30 wt. % to 75 wt. %, from 40 wt. % to 60 wt. %, from 40 wt. % to 75 wt. %, from 50 wt. % to 60 wt. %, from 50 wt. % to 75 wt. %, or from 60 wt. % to 75 wt. % water.

In embodiments, the flowback enhancer composition may comprise from 0.1 wt. % to 30 wt. % alcohols. For example, the flowback enhancer composition may comprise from 0.1 wt. % to 5 wt. %, from 0.1 wt. % to 10 wt. %, from 0.1 wt. % to 15 wt. %, from 0.1 wt. % to 20 wt. %, from 0.1 wt. % to 25 wt. %, from 0.1 wt. % to 30 wt. %, from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 10 wt. % to 15 wt. %, from 10 wt. % to 20 wt. %, from 10 wt. % to 25 wt. %, from 10 wt. % to 30 wt. %, from 15 wt. % to 20 wt. %, from 15 wt. % to 25 wt. %, or from 15 wt. % to 30 wt. % alcohols.

In embodiments, the flowback enhancer composition may comprise from 0.1 wt. % to 20 wt. % glycols. For example, the flowback enhancer composition may comprise from 0.1 wt. % to 5 wt. %, from 0.1 wt. % to 10 wt. %, from 0.1 wt. % to 15 wt. %, from 0.1 wt. % to 20 wt. %, from 1 wt. % to 5 wt. %, from 1 wt. % to 10 wt. %, from 1 wt. % to 15 wt. %, from 1 wt. % to 20 wt. %, from 5 wt. % to 10 wt. %, from 5 wt. % to 15 wt. %, from 5 wt. % to 20 wt. %, from 10 wt. % to 15 wt. %, from 10 wt. % to 20 wt. %, or from 15 wt. % to 20 wt. % glycols.

In embodiments, the flowback enhancer composition may comprise from 1 wt. % to 30 wt. % water insoluble solvents.

For example, the flowback enhancer composition may comprise from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 10 wt. % to 15 wt. %, from 10 wt. % to 20 wt. %, from 10 wt. % to 25 wt. %, from 10 wt. % to 30 wt. %, from 15 wt. % to 20 wt. %, from 15 wt. % to 25 wt. %, or from 15 wt. % to 30 wt. % water insoluble solvents.

In embodiments, the flowback enhancer composition may comprise from 0.5 wt. % to 35 wt. % surfactant mixture. For example, the flowback enhancer composition may comprise from 0.5 wt. % to 5 wt. %, from 0.5 wt. % to 10 wt. %, from 0.5 wt. % to 15 wt. %, from 0.5 wt. % to 20 wt. %, from 0.5 wt. % to 25 wt. %, from 0.5 wt. % to 30 wt. %, from 0.5 wt. % to 35 wt. %, from 1 wt. % to 5 wt. %, from 1 wt. % to 10 wt. %, from 1 wt. % to 15 wt. %, from 1 wt. % to 20 wt. %, from 1 wt. % to 25 wt. %, from 1 wt. % to 30 wt. %, from 1 wt. % to 35 wt. %, from 5 wt. % to 10 wt. %, from 5 wt. % to 15 wt. %, from 5 wt. % to 20 wt. %, from 5 wt. % to 25 wt. %, from 5 wt. % to 30 wt. %, from 5 wt. % to 35 wt. %, from 10 wt. % to 15 wt. %, from 10 wt. % to 20 wt. %, from 10 wt. % to 25 wt. %, from 10 wt. % to 30 wt. %, from 10 wt. % to 35 wt. %, from 15 wt. % to 20 wt. %, from 15 wt. % to 25 wt. %, from 15 wt. % to 30 wt. %, or from 15 wt. % to 35 wt. % surfactant mixture.

In embodiments, the flowback enhancer composition may comprise from 2 wt. % to 30 wt. % particles. For example, the flowback enhancer composition may comprise from 2 wt. % to 5 wt. %, from 2 wt. % to 10 wt. %, from 2 wt. % to 20 wt. %, from 2 wt. % to 30 wt. %, from 4 wt. % to 10 wt. %, from 4 wt. % to 20 wt. %, from 4 wt. % to 30 wt. %, from 8 wt. % to 10 wt. %, from 8 wt. % to 20 wt. %, from 8 wt. % to 30 wt. %, from 15 wt. % to 20 wt. %, from 15 wt. % to 30 wt. %, or from 20 wt. % to 30 wt. % particles.

In embodiments, the flowback enhancer composition may comprise from 0.5 wt. % to 5 wt. % salts. For example, the flowback enhancer composition may comprise from 0.5 wt. % to 1 wt. %, from 0.5 wt. % to 2 wt. %, from 0.5 wt. % to 5 wt. %, or from 2 wt. % to 5 wt. % salts. Without being bound by any particular theory, it is believed that the salt may increase the stability of the flowback enhancer composition emulsion.

In embodiments, flowback enhancer compositions described herein may be added to fracturing fluids used in stimulation operations in a subterranean formation. The fracturing fluid may be held in vessels or containers on ground, on a vehicle (for example, truck or trailer), or skid-mounted. The fracturing fluid may be, for example, water-based or oil-based. One or more pumps may be used to pump the fracturing fluid through a wellbore into the subterranean formation.

The fracturing fluid may be prepared (formulated and mixed) offsite prior to disposition of the fracturing fluid into a source vessel at a well site. A portion (some components) of the fracturing fluid may be mixed offsite and disposed into the source vessel and the remaining portion (remaining components) of the fracturing fluid added to the source vessel or to a conduit conveying the fracturing fluid. The fracturing fluid may be prepared onsite with components added to (and batch mixed in) the source vessel. Components may be added to the source vessel or to a conduit conveying the fracturing fluid during the hydraulic fracturing. In embodiments, the fracturing fluid may be made on-the-fly by mixing all of the components in the s source vessel, blending the mixture, before pumping the mixture downhole.

In embodiments, the flowback enhancer composition may be added to source vessel holding the fracturing fluid. In embodiments, the flowback enhancer composition may be added to fracturing fluid flowing from the source vessel to the pump. In embodiments, the flowback enhancer composition may be added to the fracturing fluid flowing from the pump to the wellbore. In some embodiments, one or more of the components of the flowback enhancer composition may be added to the fracturing fluid at an addition point that is different than one or more other components of the flowback enhancer composition. For example, in embodiments, the aqueous phase of the flowback enhancer composition may be added to the fracturing fluid in the source vessel, and one or more surfactants of the flowback enhancer composition may be added to the fracturing fluid as the fracturing fluid flows from the pump to the wellbore.

In embodiments, the fracturing fluid may comprise one or more proppants. The proppant can be, for example, sand or ceramic proppants. Different sized proppants may be used for the drilling operation, depending on the wellbore conditions and drilling operation parameters.

In embodiments, the fracturing fluid may comprise an amount of the flowback enhancer composition from 0.1 gallon per 1000 gallons of fluid (gpt) to 10 gpt. For example, the amount of the flowback enhancer composition in the fracturing fluid may be from 0.1 gpt to 1 gpt, from 0.1 gpt to 5 gpt, from 0.1 gpt to 10 gpt, from 1 gpt to 5 gpt, from 1 gpt to 10 gpt, or from 5 gpt to 10 gpt. Without being bound by any particular theory, it is believed that a concentration of the flowback enhancer composition below 0.1 gpt may result in low or no significant flowback enhancement. A concentration of the flowback enhancer composition above 10 gpt may not be economically feasible for operations. Further, a concentration of the flowback enhancer composition above 10 gpt may only provide negligible improved flowback enhancement compared to methods having a concentration of the flowback enhancer composition of less than 10 gpt.

In embodiments, the fracturing fluid may comprise from 0.0001 gpt to 3 gpt alcohols. For example, the fracturing fluid may comprise from 0.0001 gpt to 1 gpt, from 0.0001 gpt to 2 gpt, from 0.0001 gpt to 3 gpt, from 0.01 gpt to 1 gpt, from 0.01 gpt to 2 gpt, from 0.01 gpt to 3 gpt, from 1 gpt to 2 gpt, or from 1 gpt to 3 gpt alcohols.

In embodiments, the fracturing fluid may comprise from 0.0005 gpt to 4 gpt of the surfactant mixture. For example, the fracturing fluid may comprise from 0.0005 gpt to 1 gpt, from 0.0005 gpt to 2 gpt, from 0.0005 gpt to 3 gpt, from 0.0005 gpt to 4 gpt, from 0.01 gpt to 1 gpt, from 0.01 gpt to 2 gpt, from 0.01 gpt to 3 gpt, from 0.01 gpt to 4 gpt, from 1 gpt to 2 gpt, from 1 gpt to 3 gpt, from 1 gpt to 4 gpt, from 2 gpt to 3 gpt, from 2 gpt to 4 gpt or from 3 gpt to 4 gpt of the surfactant mixture.

In embodiments, the fracturing fluid may comprise from 0.002 gpt to 3 gpt of the particles. For example, the fracturing fluid may comprise from 0.002 gpt to 0.5 gpt, from 0.002 gpt to 1 gpt, from 0.002 gpt to 2 gpt, from 0.002 gpt to 3 gpt, from 0.02 gpt to 0.5 gpt, from 0.02 gpt to 1 gpt, from 0.02 gpt to 2 gpt, from 0.02 gpt to 3 gpt, from 0.1 gpt to 0.5 gpt, from 0.1 gpt to 1 gpt, from 0.1 gpt to 2 gpt, from 0.1 gpt to 3 gpt, from 1 gpt to 2 gpt, from 1 gpt to 3 gpt, or from 2 gpt to 3 gpt of the one or more particles.

In embodiments, the fracturing fluid may comprise from 1 gpt to 5 gpt clay inhibitor. For example, the fracturing fluid may comprise from 1 gpt to 2 gpt, from 1 gpt to 3 gpt, from 1 gpt to 4 gpt, from 1 gpt to 5 gpt, from 2 gpt to 3 gpt, from 2 gpt to 4 gpt, from 2 gpt to 5 gpt, from 3 gpt to 4 gpt, from 3 gpt to 5 gpt, or from 4 gpt to 5 gpt clay inhibitor.

In embodiments, the fracturing fluid may comprise from 1 gpt to 5 gpt friction reducer. For example, the fracturing fluid may comprise from 1 gpt to 2 gpt, from 1 gpt to 3 gpt, from 1 gpt to 4 gpt, from 1 gpt to 5 gpt, from 2 gpt to 3 gpt, from 2 gpt to 4 gpt, from 2 gpt to 5 gpt, from 3 gpt to 4 gpt, from 3 gpt to 5 gpt, or from 4 gpt to 5 gpt friction reducer.

In embodiments, the fracturing fluid may comprise from 1 gpt to 5 gpt scale inhibitor. For example, the fracturing fluid may comprise from 1 gpt to 2 gpt, from 1 gpt to 3 gpt, from 1 gpt to 4 gpt, from 1 gpt to 5 gpt, from 2 gpt to 3 gpt, from 2 gpt to 4 gpt, from 2 gpt to 5 gpt, from 3 gpt to 4 gpt, from 3 gpt to 5 gpt, or from 4 gpt to 5 gpt scale inhibitor.

In embodiments, the fracturing fluid may comprise from 0.1 gpt to 50 gpt oxidizer breakers. For example, the fracturing fluid may comprise from 0.1 gpt to 1 gpt, from 0.1 gpt to 2 gpt, from 0.1 gpt to 3 gpt, from 0.1 gpt to 4 gpt, from 0.1 gpt to 5 gpt, from 2 gpt to 3 gpt, from 2 gpt to 4 gpt, from 2 gpt to 5 gpt, from 3 gpt to 4 gpt, from 3 gpt to 5 gpt, or from 4 gpt to 5 gpt oxidizer breakers. In embodiments, the oxidizer breaker can be a solid that is added to the fracturing fluid in an amount of from 0.1 pounds per thousand gallon (ppt) to 50 ppt. Examples of suitable oxidizer breakers include, but are not limited to, sodium persulfate, sodium perborate, sodium per carbonate, ammonium persulfate, potassium persulfate, sodium bromate, sodium chlorite, calcium peroxide, magnesium peroxide, and sodium hypochloride.

In embodiments, the fracturing fluid may comprise from 0.25 pounds of proppants per gallon of fracturing fluid to 10 pounds of proppants per gallon of fracturing fluid. Proppant can be in various sizes depending on the application, such as 100 mesh, 40/70 mesh, 30/50 mesh, 20/40 mesh or 12/20 mesh in size. Non-limiting examples of the proppant can include sand, ceramic, thermoplastic, or walnut hulls.

In embodiments disclosed herein, a recovery rate of fracturing fluid during wellbore stimulation operations may be increased. Increased recovery of the fracturing fluids in wells may lead to lower water saturation in in the formation, which may reduce damage to the formation due to the swelling of clays present in the well. By reducing damage to the formation, a rate of production of oil and gas from the well may be improved. Further, increased recovery of the fracturing fluid may reduce waste and enable the reuse of the recovered fracturing fluid in further drilling operations.

According to a first aspect, either alone or in combination with any other aspect, a method of hydraulic fracturing comprises: passing a fracturing fluid through a wellbore into a subterranean formation, wherein the fracturing fluid comprises a flowback enhancer composition in an amount of from 0.10 gallon per 1000 gallons of fluid (gpt) to 10 gpt based on the total volume of fracturing fluid; hydraulically fracturing the subterranean formation with the fracturing fluid, thereby generating fractures in the subterranean formation; passing the fracturing fluid to a surface of the well, wherein the fracturing fluid is mixed with hydrocarbons; and at least partially separating the fracturing fluid from the hydrocarbons to yield a recovered fracturing fluid. The flowback enhancer composition can comprise a solvent mixture comprising an aqueous solution, at least one unsaturated ester, and at least one alcohol; a surfactant mixture comprising at least one secondary alcohol ethoxylate and at least one castor oil ethoxylate, wherein the fracturing fluid comprise from 0.0005 gpt to 4 gpt of the surfactant mixture; and one or more particles having a widest length of from 1 nanometer to 200 nanometers, wherein the fracturing fluid comprises from 0.002 gpt to 3 gpt of the one or more particles having a widest length of from 1 nanometer to 200 nanometers According to a second aspect, either alone or in combination with any other aspect, wherein passing the fracturing fluid through the wellbore into a subterranean formation comprises adding the flowback enhancer composition to the fracturing fluid flowing from a pump to the wellbore.

According to a third aspect, either alone or in combination with any other aspect, wherein the at least one alcohol is selected from the group consisting of methanol, ethanol, butanol, isopropanol, n-hexanol, ethylene glycol, propylene glycol, polyethylene glycol, triethylene glycol, diethylene glycol monomethyl ether, 2-ethylhexanol, or combinations thereof.

According to a fourth aspect, either alone or in combination with any other aspect, wherein the at least one unsaturated ester comprises methyl-9-dodecenoate and the at least one alcohol comprises isopropanol.

According to a fifth aspect, either alone or in combination with any other aspect, wherein the secondary alcohol ethoxylate comprises dodecylbenzene sulfonic acid.

According to a sixth aspect, either alone or in combination with any other aspect, wherein the surfactant mixture further comprises at least one modified quaternary imidazoline.

According to a seventh aspect, either alone or in combination with any other aspect, wherein the surfactant mixture further comprises at least one poloxamer, wherein the poloxamer comprises a compound of formula (I):

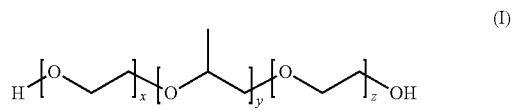

(I)

wherein x and z are each independently an integer from 2 to 130, and y is an integer from 15 to 67.

According to an eighth aspect, either alone or in combination with any other aspect, wherein the surfactant mixture further comprises dodecylbenzene sulfonic acid.

According to a ninth aspect, either alone or in combination with any other aspect, wherein the one or more particles having a widest length of from 1 nanometer to 200 nanometers comprise silica, alumina, zirconia, clay, carbon, single-wall nanotubes, nanodiamonds, layered magnesium silicate, or combinations thereof.

According to a tenth aspect, either alone or in combination with any other aspect, wherein the one or more particles having a widest length of from 1 nanometer to 200 nanometers is layered magnesium silicates comprising: a first silicate layer; a layer comprising magnesium; and a second silicate layer; where the layer comprising magnesium is positioned between the first silicate layer and the second silicate layer.

According to an eleventh aspect, either alone or in combination with any other aspect, further comprising passing a hydrocarbon stream in the subterranean formation to the surface of the well.

According to a twelfth aspect, either alone or in combination with any other aspect, wherein the flowback enhancer composition increases a rate of production of the hydrocarbon stream.

According to a thirteenth aspect, either alone or in combination with any other aspect, a flowback enhancer composition comprises a solvent mixture comprising an aqueous solution, at least methyl-9-dodecenoate, and at least isopropanol; a surfactant mixture comprising at least dodecylbenzene sulfonic acid and a castor oil ethoxylate; and one or more particles having a widest length of from 1 nanometer to 200 nanometers.

According to a fourteenth aspect, either alone or in combination with any other aspect, wherein the solvent mixture further comprises methanol, ethanol, butanol, n-hexanol, ethylene glycol, propylene glycol, polyethylene glycol, triethylene glycol, diethylene glycol monomethyl ether, 2-ethylhexanol, or combinations thereof.

According to a fifteenth aspect, either alone or in combination with any other aspect, wherein the surfactant mixture further comprises at least one modified quaternary imidazoline.

According to a sixteenth aspect, either alone or in combination with any other aspect, wherein the surfactant mixture further comprises at least one poloxamer, wherein the poloxamer comprises a compound of formula (I):

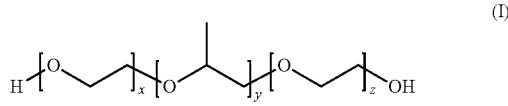

(I)

wherein x and z are each independently an integer from 2 to 130, and y is an integer from 15 to 67.

According to a seventeenth aspect, either alone or in combination with any other aspect, wherein the surfactant mixture further comprises dodecylbenzene sulfonic acid.

According to an eighteenth aspect, either alone or in combination with any other aspect, wherein the one or more particles having a widest length of from 1 nanometer to 200 nanometers comprise silica, alumina, zirconia, clay, carbon, single-wall nanotubes, nanodiamonds, layered magnesium silicate, or combinations thereof.

According to a nineteenth aspect, either alone or in combination with any other aspect, wherein the one or more particles having a widest length of from 1 nanometer to 200 nanometers is layered magnesium silicates comprising: a first silicate layer; a layer comprising magnesium; and a second silicate layer; where the layer comprising magnesium is positioned between the first silicate layer and the second silicate layer.

According to a twentieth aspect, either alone or in combination with any other aspect, wherein the flowback enhancer composition comprises from 2 weight percent to 30 weight percent of the one or more particles having a widest length of from 1 nanometer to 200 nanometers.

Test Methods

The various embodiments disclosed herein will be evaluated by the following test methods. The test methods are illustrative in nature, and should not be understood to limit the embodiments disclosed herein.

Aqueous Fluid Displacement/Recovery Column Test

Sand or carbonate particle packed columns are used to simulate fluid recovery in a proppant pack. Base fluid 6 wt. % KCl without any surfactant is tested in the column and the fluid recovery is used as a baseline to evaluate improvement in fluid recovery with the addition of flowback enhancer compositions described herein.

A fluid displacement plexiglass column is used. The plexiglass column is 8 inches long and has a 1 inch internal diameter. Each end cap has a 200 mesh screen to prevent fines from the pack from plugging the line. A 200 mL sample of the base fluid with 2 gpt of flowback enhancer is prepared. 40 mL of the sample are then added into the empty column. The particle is packed into the column by adding slowly while mixing until the column is topped-off. Nitrogen gas is used to apply pressure through the bottom of column to pump out the aqueous solution through the column, which mimics reservoir gas in a formation forcing fracturing fluid through the formation and into the wellbore. A calibrated flow meter is used to verify the flow rate of the aqueous solution before each test. Fluid is tested with 40/70 sand and 215 micron-300 micron carbonate particles at a gas flow rate of 60 cc/min. An electronic lab balance and weight data collector software are used to record the weight of the fluid collected from the column. The density of the fluid recorded with a densiometer and volume of fluid recovered is calculated from the mass values recorded during testing.

Gravity Drainage Fluid Recovery Column Test

Step 1: Packing the column and determining the pore volume.

An 8.5 cm-long, 1.6 cm internal diameter short glass column equipped with stainless screen of 200 mesh and a drainage valve with stopcock 316 used for this test. The valve was closed before the column is packed. The column was gravity packed by pouring approximately 10 mL of 6% KCl in water, 10 mL of 6% KCl in water containing 0.2% v/v of flowback enhancer compositions without the particles, or 10 mL of 6% KCl in water containing 0.2% v/v of flowback enhancer compositions with 10 volume % particles solution into the column followed by a slow, continuous addition of 10 g of 40/70 mesh sand while vibrating the column. The column is kept vibrating until the pack height in the column is stabilized. The excess fluid above the pack is removed from the column so that level of the liquid matches the level of sand in the column. The pore volume of the packed column is calculated as the difference in volume of fluid prior to column packing and after the column has been packed.

Step 2: Treatment of pack with flowback enhancer composition followed by oil drainage.

Additional volumes of 6% KCl, 6% KCl containing 0.2% v/v of flowback enhancer compositions without particles, or 6% KCl containing 0.2% v/v of flowback enhancer containing 10% particles solution are passed through the column, corresponding to the fluid used in Step 1 by opening the valve and draining fluid through the pack, while constantly replenishing the fluid on top of the pack to prevent drying of the column. The drained fluid is collected in a graduated cylinder. After the last additional volume of the fluid is passed through the column, the level of the fluid is adjusted to the level of sand bed by closing the valve once the fluid had reached the level of the sand bed. Crude oil is then added to the top of the sand bed to form 5 cm oil in the column above the sand bed. The valve is then opened, and the displaced aqueous fluid is collected in a graduated cylinder. This graduated cylinder is kept on a balance connected to a data logger, which automatically collects weight with respect to time. The oil height above the sand bed is kept constant at 5 cm by addition of more crude oil using a dropper. The experiment is conducted for 30-60 min depending on the flow rate. When both aqueous solution and oil are produced from the column, the aqueous solution and oil are separated and weighed separately. The cumulative fraction weights are divided by pore volume weight and reported as percent fluid recovery with respect to time. The breakthrough time of oil, that is, the time after opening valve for oil to appear in the graduate cylinder, is also measured.

EXAMPLES

The various embodiments disclosed herein will be further clarified by the following examples. The examples are illustrative in nature, and should not be understood to limit the embodiments disclosed herein.

Example 1. Synthesis of Layered Magnesium Silicates

In Example 1, layered magnesium silicates were prepared using aminopropyltrimethoxysilane, magnesium chloride hexahydrate, and an alkaline solution. In Examples 1-1 and 1-2, the alkaline solution was varied.

Example 1-1

To produce Example 1-1, magnesium chloride hexahydrate (30.0 g) was dissolved in 100 mL of water. Subsequently, aminopropyltrimethoxysilane (43.5 g) was added with stirring at room temperature (20-30° C.). NaOH (11.8 g) was dissolved in 25 mL of water to form an alkaline solution. The alkaline solution was added to the reaction mixture at 2 mL/min and the reaction mixture was stirred at room temperature over a period of 1 hour. Subsequently, the reaction mixture was heated at a rate of 5° C./minute until it reached a temperature from 100° C.-105° C., followed by refluxing for 23 hours. The reaction mixture was then cooled to room temperature to form a dispersion. The solids content of the dispersion was measured by evaporation of liquid and was calculated as 22.5 wt. %. The pH of the dispersion was adjusted to 6.5-7.5 by adding 1M HCl solution. The dispersion was then diluted with water to obtain an approximately 2.1-2.2 wt. % solution. This final dispersion is denoted as Example 1-1.

Example 1-2

To produce Example 1-2, magnesium chloride hexahydrate (30.0 g) was dissolved in 150 mL of water. Subsequently, aminopropyltrimethoxysilane (43.5 g) was added with stirring at room temperature (20-30° C.). KOH (16.6 g) was dissolved in 50 mL of water to form an alkaline solution. The alkaline solution was added to the reaction mixture at 2 mL/min and the reaction mixture was stirred at room temperature over a period of 1 hour. Subsequently, the reaction mixture was heated at a rate of 5° C./minute until it reached a temperature from 100° C.-105° C., followed by refluxing for 23 hours. The reaction mixture was then cooled to room temperature to form a dispersion. The solids content of the dispersion was 21-22 wt. %. The pH of the dispersion was adjusted to 6.5-7.5 by adding 1M HCl solution. The dispersion was then diluted with water to obtain an approximately 2.1-2.2 wt. % solution. This final dispersion is denoted as Example 1-2.

Example 2. Characterization of Example 1-1 and Example 1-2

Example 1-1 and Example 1-2 were characterized. The formation of layered structure and organic functionalities attached on the layered surfaces are confirmed by Fourier Transform Infrared (FT-IR), Powder X-ray Diffraction (PXRD), and Thermogravimetric (TGA) analysis. The FTIR spectra recorded in attenuated total reflection (ATR) mode within the range from 400 cm$^{-1}$ to 4000 cm$^{-1}$ using a Bruker Tensor 37 FTIR (MiD IR/ATR) spectrometer. PXRD analysis was carried out on Rigaku benchtop Miniflex 600, equipped with monochromatic X-ray source (600 W) and a D/teX Ultra 1D silicon strip detector. Thermal stability of the materials was evaluated with TGA using a SDT q600 TA instrument.

It is believed that layered magnesium silicates have lamellar structure like natural talc, trioctahedral phyllosilicates, with elemental composition of $Si_4Mg_3O_{10}(OH)_2$. The nanometer-thick layer of magnesium silicates composed of a layer of magnesium-oxygen/hydroxyl octahedral, may be sandwiched between two layers of silicon—oxygen tetrahedra. The nanometer-thick platelets may be formed with the aminopropyl groups covalently bonded within the interlayer space through the Si—C bonds and the aminopropyl functionalities intercalated into the interlayer spaces of layered materials.

Figure 2:
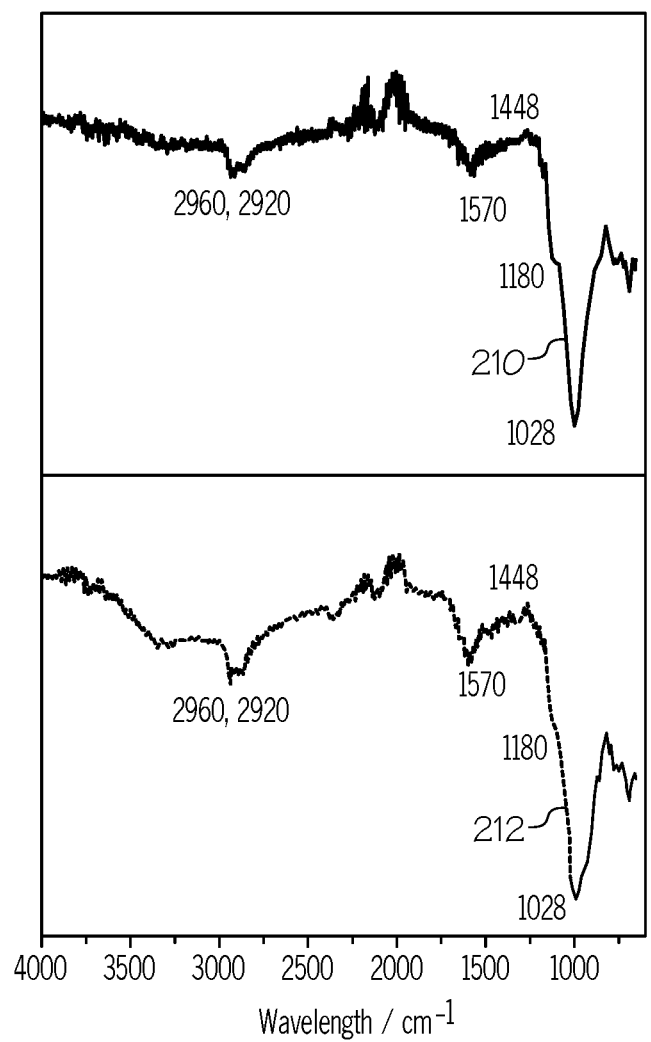
FIG. 2 is FT-IR spectra, according to one or more embodiments described herein.

The presence of aminopropyl functionalities covalently-linked on the surface of Example 1-1 and Example 1-2 is confirmed by the FT-IR spectra (FIG. 2). Specifically, Example 1-1 spectrum 210, and Example 1-2 spectrum 220 are shown in FIG. 2. The bands at 1028 cm$^{-1}$ are attributed to Si—O—Si stretching vibrations. The vibrations of the inorganic framework are not altered upon organic functionalization of layered magnesium silicates. The methyl and methylene units are ascribed at 2960 cm$^{-1}$, 2920 cm$^{-1}$ and 1448 cm$^{-1}$, confirmed the presence of organic matter in the material. The stretching bands are also observed at 1180 cm$^{-1}$ and 1570 cm$^{-1}$ due to Si—C and N—H moieties, respectively.

Figure 3:
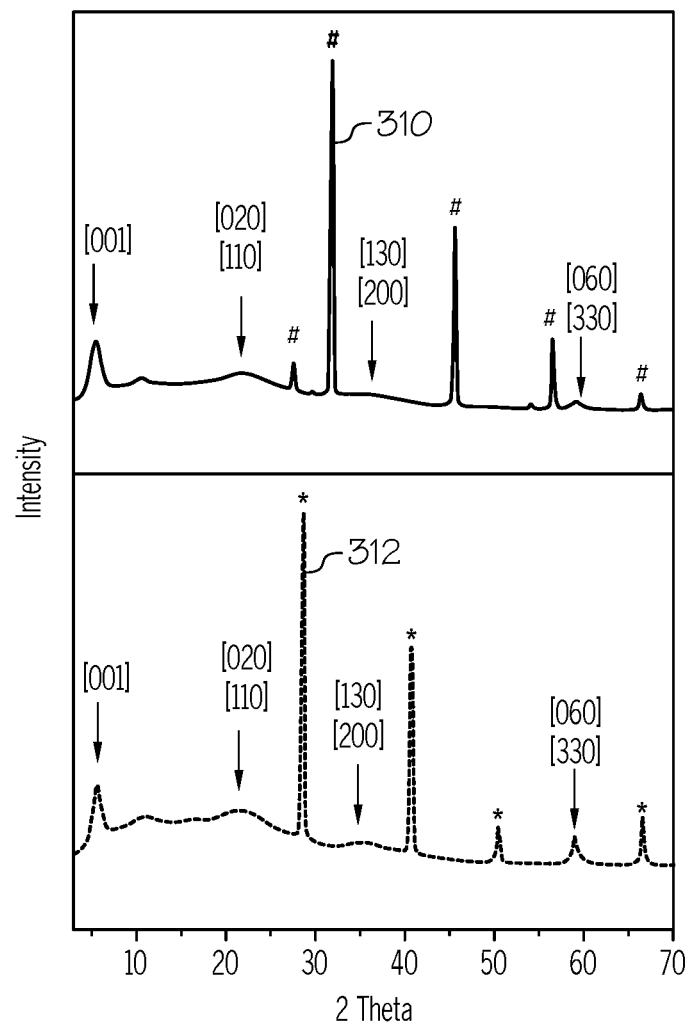
FIG. 3 is PXRD spectra, according to one or more embodiments described herein.

In the PXRD spectra for Example 1-1 310 and Example 1-2 320 (FIG. 3), the [001] reflection for Example 1-1 and Example 1-2 demonstrated the formation of layered materials. The interlayer spacing that is calculated from this reflection is observed to be 1.34 nm. Although the synthesis approach uses two different types of alkaline solutions as catalysts e.g. NaOH and KOH, both synthetic routes form similar structures. The intralayer reflection (060, 330) is characteristic of the 2:1 trioctahedral phyllosilicate structure and remain unchanged. The reflections at (020, 110) and (130, 200) are the fingerprint region for the phyllosilicate materials, which demonstrated the formation of desired materials. This indicates that the layered inorganic framework can accommodate a range of organic functionalities with Si—C linkages without the loss of long-range periodicity. Since Example 1-1 and Example 1-2 have not been washed, the presence of NaCl and KCl peaks are observed in the PXRD patterns.

Figure 4:
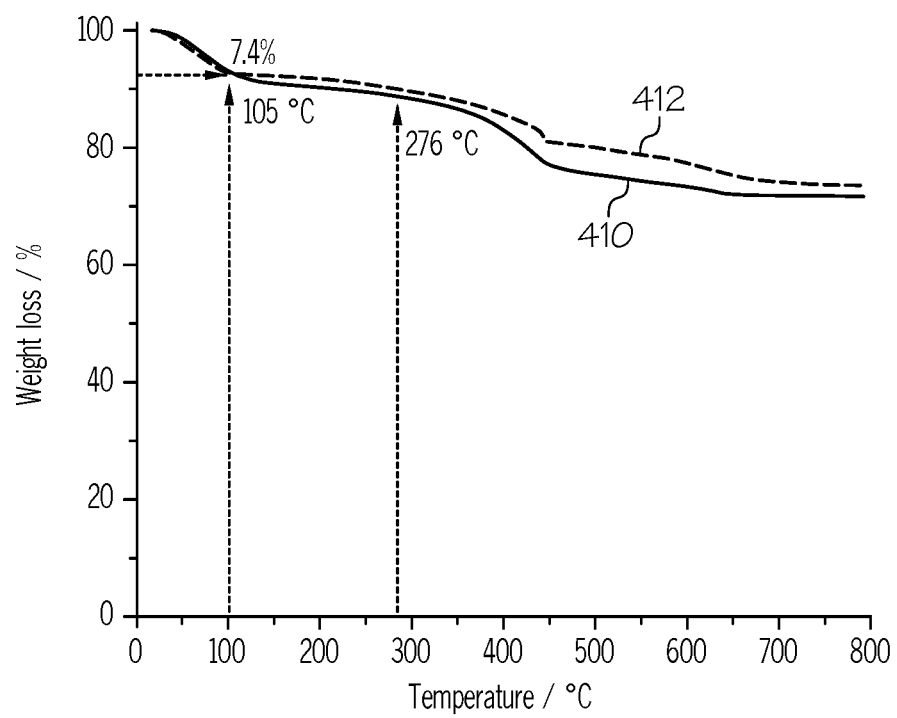
FIG. 4 is TGA spectra, according to one or more embodiments described herein.

Thermal stability of materials that are employed under downhole conditions is considered to be vital parameter for application in high pressure and high temperature. TGA spectra of Example 1-1 410 and Example 1-2 420 (FIG. 4) demonstrated mass loss of 7.4% up to 105° C., which corresponds to adsorbed water in the materials. The decomposition of the organic moieties attached on the surface of Example 1-1 and Example 1-2 did not occur until reaching a temperature of approximately 276° C., suggesting that these materials show excellent thermal stability.

Example 3. Preparation of Flowback Enhancer Compositions

In Example 3, flowback enhancer compositions were prepared by combining various solvents, surfactants, and other compounds.

Example 3-1

To produce Example 3-1, a mixture was prepared according to Table 1. TERGITOL™ 15-S-7 is a commercially available secondary alcohol ethoxylate. Pluronic® L-64 is a commercially available poloxamer comprising an ethylene oxide-polyethylene oxide-ethylene oxide triblock surfactant. Lumulse™ CO-30 is a commercially available castor oil ethoxylate. DOWANOL™ DPM is commercially available dipropylene glycol methyl ether. Elevance HFS® 10 solvent is an unsaturated ester solvent from Elevance.

TABLE 1

| Addition Sequence | Chemicals | Weight (g) | Percentage |
|---|---|---|---|
| 1 | DI Water | 25 | 25% |
| 2 | Isopropanol | 10 | 10% |
| 3 | TERGITOL ™ 15-S-7, Sigma Aldrich | 5 | 5% |
| 4 | Pluronic ® L-64 (PEG-b-PPG-b-PEG $M_n$ 2900), BASF | 15 | 15% |
| 5 | Lumulse ™ CO-30, Vantage | 15 | 15% |
| 6 | DOWANOL ™ DPM (Di (propylene glycol) methyl ether), Dow Chemical | 15 | 15% |
| 7 | Propylene glycol | 5 | 5% |
| 8 | Elevance HFS ® 10 solvent, Elevance | 10 | 10% |

Example 3-2

To produce Example 3-2, a mixture was prepared according to Table 2. Quatrex 172 is a commercially available modified quaternary imidazoline.

TABLE 2

| Addition Sequence | Chemicals | Weight (g) | Percentage |
|---|---|---|---|
| 1 | DI Water | 10 | 10% |
| 2 | Isopropanol | 10 | 10% |
| 3 | TERGITOL ™ 15-S-7, Sigma Aldrich | 5 | 5% |
| 4 | Lumulse ™ CO-30, Vantage | 15 | 15% |
| 5 | Quatrex 172, Lubrizol | 30 | 30% |
| 6 | Triethylene glycol | 5 | 5% |
| 7 | DOWANOL ™ DPM (Di (propylene glycol) methyl ether), Dow Chemical | 15 | 15% |
| 8 | Elevance HFS ® 10 solvent, Elevance | 10 | 10% |

Example 3-3

To produce Example 3-3, a mixture was prepared according to Table 3.

TABLE 3

| Addition Sequence | Chemicals | Weight (g) | Percentage |
|---|---|---|---|
| 1 | Water | 40 | 40% |
| 2 | Isopropanol | 5 | 5% |

TABLE 3-continued

| Addition Sequence | Chemicals | Weight (g) | Percentage |
|---|---|---|---|
| 3 | TERGITOL ™ 15-S-7, Sigma Aldrich | 10 | 10% |
| 4 | Pluronic ® L-64 (PEG-b-PPG-b-PEG $M_n$ 2900), BASF | 10 | 10% |
| 5 | Dodecylbenzene sulfonic acid | 15 | 15% |
| 6 | Lumulse ™ CO-30, Vantage | 5 | 5% |
| 7 | Propylene glycol | 5 | 5% |
| 8 | Triethylene glycol | 5 | 5% |
| 9 | Elevance HFS ® 10 solvent, Elevance | 5 | 5% |

Example 4. Preparation of Flowback Enhancer Compositions with Particles

In Example 4, flowback enhancer compositions were prepared by mixing Examples 3-1, 3-2, and 3-3 with three different particles solutions (Example 1-1, Example 1-2, and nanosilica). Example 4 flowback enhancer compositions are summarized in Table 4.

TABLE 4

| Example | Solution (90% v) | Particles Solution (10% v) |
|---|---|---|
| Ex. 4-1a | Ex. 3-1 | Ex. 1-1 |
| Ex. 4-2a | Ex. 3-2 | Ex. 1-1 |
| Ex. 4-3a | Ex. 3-3 | Ex. 1-1 |
| Ex. 4-1b | Ex. 3-1 | Ex. 1-2 |
| Ex. 4-2b | Ex. 3-2 | Ex. 1-2 |
| Ex. 4-3b | Ex. 3-3 | Ex. 1-2 |
| Ex. 4-1c | Ex. 3-1 | Snowtex ® |
| Ex. 4-2c | Ex. 3-2 | Snowtex ® |
| Ex. 4-3c | Ex. 3-3 | Snowtex ® |

Example 4-1

Examples 4-1a, 4-1b, and 4-1c were prepared by mixing the flowback enhancer composition of Example 3-1 with Example 1-1, Example 1-2, and nanosilica, respectively. The flowback enhancer compositions were prepared by combining 90 volume % Example 3-1 and 10 volume % particles solution (Example 1-1, Example 1-2, nanosilica). The nanosilica solution used is Snowtex®, a commercially available product from Nissan Chemical America Corporation. Snowtex® nanosilica used in the examples has an average diameter of from 10 nm to 100 nm in solution.

Example 4-2

Examples 4-2a, 4-2b, and 4-2c were prepared by mixing the flowback enhancer composition of Example 3-2 with Example 1-1, Example 1-2, and nanosilica, respectively. The flowback enhancer compositions were prepared by combining 90 volume % Example 3-1 and 10 volume % particles solution (Example 1-1, Example 1-2, nanosilica). The nanosilica solution used is Snowtex®.

Example 4-3

Examples 4-3a, 4-3b, and 4-3c were prepared by mixing the flowback enhancer composition of Example 3-2 with Example 1-1, Example 1-2, and nanosilica, respectively. The flowback enhancer compositions were prepared by combining 90 volume % Example 3-1 and 10 volume % particles solution (Example 1-1, Example 1-2, nanosilica). The nanosilica solution used is Snowtex®.

Comparative Example 1. Preparation of KCl Solution with and without Particles A 6 wt. % KCl solution was prepared for Comparative Example 1. Specifically, 15 g of KCl was added to 250 mL of water and stirred until clear.

Comparative Examples 1-1, 1-2, and 1-3 were prepared by mixing 100 mL of the 6 wt. % KCl solution with 0.2 mL of Example 1-1, Example 1-2, and Snowtex®, respectively, and mixing for 5 minutes.

Comparative Example 1-4 is 6 wt. % KCl solution, as described previously.

Formulations for Comparative Examples 1-1, 1-2, 1-3, and 1-4 are summarized in Table 5.

TABLE 5

| Example | Solution | Particles (2 gpt) |
| --- | --- | --- |
| Comp. Ex. 1-1 | 6 wt. % KCl | Ex. 1-1 |
| Comp. Ex. 1-2 | 6 wt. % KCl | Ex. 1-2 |
| Comp. Ex. 1-3 | 6 wt. % KCl | Snowtex® |
| Comp. Ex. 1-4 | 6 wt. % KCl | — |

Example 5. Preparation of Flowback Enhancer Fluid Mixtures with Particles 6 wt. % KCl solution was prepared as previously described. Flowback enhancer fluid mixtures of Example 5 were prepared by adding flowback enhancer compositions of Example 4 to 6 wt. % KCl solutions at a concentration of 2 gpt. Specifically, flowback enhancer fluid mixtures were prepared, according to Table 6.

TABLE 6

| Example | Solution | Flowback Enhancer Composition (2 gpt) |
| --- | --- | --- |
| Ex. 5-1a | 6 wt. % KCl | Ex. 4-1a |
| Ex. 5-2a | 6 wt. % KCl | Ex. 4-2a |
| Ex. 5-3a | 6 wt. % KCl | Ex. 4-3a |
| Ex. 5-1b | 6 wt. % KCl | Ex. 4-1b |
| Ex. 5-2b | 6 wt. % KCl | Ex. 4-2b |
| Ex. 5-3b | 6 wt. % KCl | Ex. 4-3b |
| Ex. 5-1c | 6 wt. % KCl | Ex. 4-1c |
| Ex. 5-2c | 6 wt. % KCl | Ex. 4-2c |
| Ex. 5-3c | 6 wt. % KCl | Ex. 4-3c |

Example 6. Preparation of Flowback Enhancer Fluid Mixtures without Particles 6 wt. % KCl solution was prepared as previously described. Flowback enhancer fluid mixtures of Example 6 were prepared by adding flowback enhancer compositions of Example 3 to 6 wt. % KCl solutions at a concentration of 2 gpt. Specifically, flowback enhancer fluid mixtures were prepared, according to Table 7.

TABLE 7

| Example | Solution | Flowback Enhancer Composition (2 gpt) |
| --- | --- | --- |
| Ex. 6-1 | 6 wt. % KCl | Ex. 3-1 |
| Ex. 6-2 | 6 wt. % KCl | Ex. 3-2 |
| Ex. 6-3 | 6 wt. % KCl | Ex. 3-3 |

Example 7. pH of Flowback Enhancer Compositions

The pH of previous Examples were measured and summarized in Table 8.

TABLE 8

| Example | pH |
| --- | --- |
| Ex. 1-1 | 10.71 |
| Ex. 1-2 | 10.41 |
| Snowtex® | 10.22 |
| Ex. 4-1a | 10.11 |
| Ex. 4-2a | 8.05 |
| Ex. 4-3a | 1.12 |
| Ex. 4-1b | 9.88 |
| Ex. 4-2b | 7.81 |
| Ex. 4-3b | 1.03 |
| Ex. 4-1c | 8.4 |
| Ex. 4-2c | 5.03 |
| Ex. 4-3c | 1.2 |
| Comp. Ex. 1-1 | 10.06 |
| Comp. Ex. 1-2 | 9.51 |
| Comp. Ex. 1-3 | 6.22 |
| Ex. 5-1a | 9.48 |
| Ex. 5-2a | 8.58 |
| Ex. 5-3a | 3.6 |
| Ex. 5-1b | 8.9 |
| Ex. 5-2b | 7.4 |
| Ex. 5-3b | 3.37 |
| Ex. 5-1c | 5.85 |
| Ex. 5-2c | 4.72 |
| Ex. 5-3c | 3.11 |

Example 8. Fluid Displacement Using Flowback Enhancer Fluid Mixtures

Fluid recovery % using flowback enhancer fluid mixtures was measured, according to the aqueous fluid displacement/recovery column test method described previously using a 40/70 mesh sand filled column. The experiments were performed using Comparative Example 1, Example 5, and Example 6.

Fluid Displacement with and without Example 1-1 Particles

Figure 5:
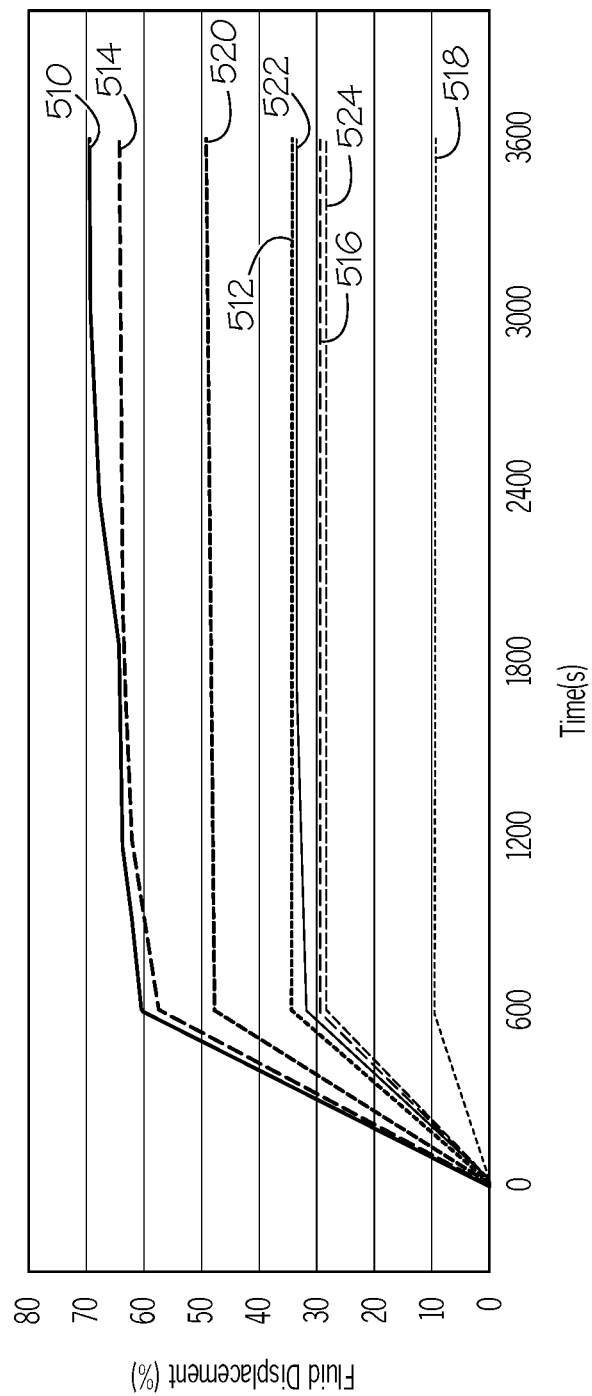
FIG. 5 is a plot of fluid displacement data, according to one or more embodiments described herein.

The fluid displacement % using the previous Examples was measured over time and plotted. Specifically, the fluid displacement % for Comp. Ex. 1-1 510, Comp. Ex 1-4 512, Ex. 5-1a 514, Ex. 5-2a 516, Ex. 5-3a 518, Ex. 6-1 520, Ex. 6-2 522, and Ex. 6-3 524 are shown in FIG. 5. A summary of the overall fluid recovery % for each Example is summarized in Table 9.

TABLE 9

| Flowback Enhancer Fluid Mixture | Flowback Enhancer Composition | Particles | Fluid Recovery % |
| --- | --- | --- | --- |
| Comp. Ex. 1-1 | — | Ex. 1-1 | 34% |
| Comp. Ex. 1-4 | — | — | 10% |

TABLE 9-continued

| Flowback Enhancer Fluid Mixture | Flowback Enhancer Composition | Particles | Fluid Recovery % |
|---|---|---|---|
| Ex. 5-1a | Ex. 3-1 | Ex. 1-1 | 65% |
| Ex. 5-2a | Ex. 3-2 | Ex. 1-1 | 30% |
| Ex. 5-3a | Ex. 3-3 | Ex. 1-1 | 70% |
| Ex. 6-1 | Ex. 3-1 | — | 49% |
| Ex. 6-2 | Ex. 3-2 | — | 34% |
| Ex. 6-3 | Ex. 3-3 | — | 28% |

As shown in FIG. 5 and Table 9, when 6% KCl was used without any additives, only 10% of fluid was displaced (Comp. Ex. 1-4). When 2 gpt of Ex. 1-1 was added to the 6% KCl fluid, the recovery increased to 34% (Comp. Ex. 1-1). Adding 2 gpt of Ex. 3-1 in 6% KCl increased the recovery to 49% (Ex. 6-1). When this example was further modified to include particles of Ex. 1-1, the recovery increased to 65% (Ex. 5-1a). However, the addition of particles of Ex. 1-1 to Ex. 3-2 in a 6% KCl solution did not result in increased recovery. The greatest recovery enhancement was observed for Ex. 5-3a, which included the flowback enhancer composition Ex. 3-3 and the particles of Ex. 1-1.

Fluid Displacement with and without Example 1-2 Particles

Figure 6:
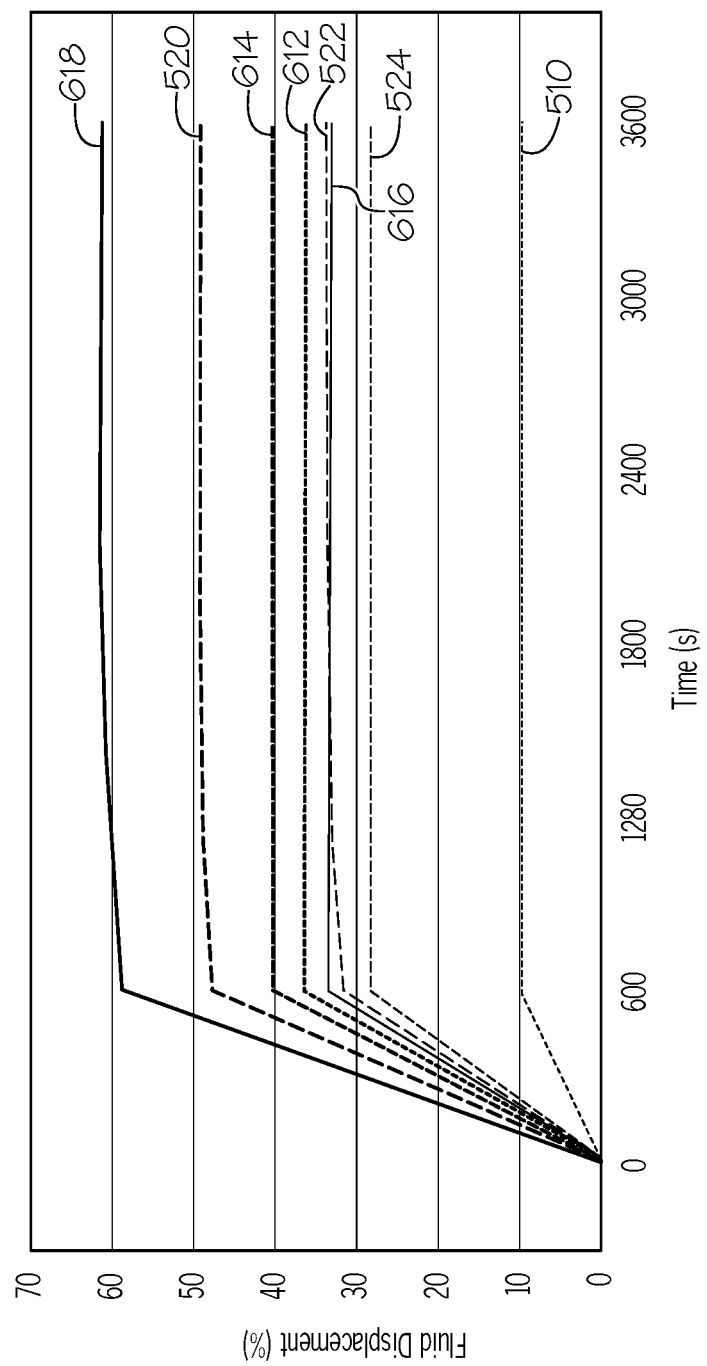
FIG. 6 is a plot of fluid displacement data, according to one or more embodiments described herein.

The fluid displacement % using the previous Examples was measured over time and plotted. Specifically, the fluid displacement % for Comp. Ex. 1-2 610, Comp. Ex 1-4 512, Ex. 5-1b 614, Ex. 5-2b 616, Ex. 5-3b 618, Ex. 6-1 520, Ex. 6-2 522, and Ex. 6-3 524 are shown in FIG. 6. A summary of the overall fluid recovery % for each Example is summarized in Table 10.

TABLE 10

| Flowback Enhancer Fluid Mixture | Flowback Enhancer Composition | Particles | Fluid Recovery % |
|---|---|---|---|
| Comp. Ex. 1-2 | — | Ex. 1-2 | 36% |
| Comp. Ex. 1-4 | — | — | 10% |
| Ex. 5-1b | Ex. 3-1 | Ex. 1-2 | 40% |
| Ex. 5-2b | Ex. 3-2 | Ex. 1-2 | 33% |
| Ex. 5-3b | Ex. 3-3 | Ex. 1-2 | 61% |
| Ex. 6-1 | Ex. 3-1 | — | 49% |
| Ex. 6-2 | Ex. 3-2 | — | 34% |
| Ex. 6-3 | Ex. 3-3 | — | 28% |

As shown in FIG. 6 and Table 10, the greatest improvement of recovery % was observed by adding particles (Ex. 1-2) to Ex. 3-3, as shown in Ex. 5-3b.

Fluid Displacement with and without Silica Particles

Figure 7:
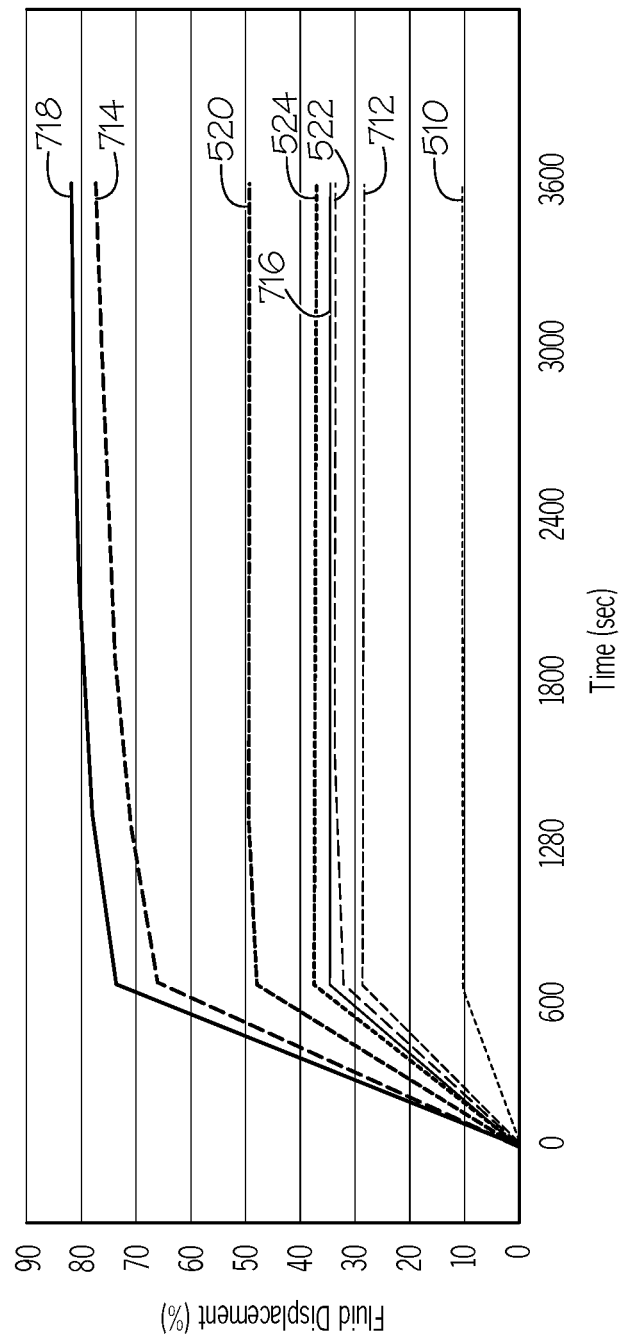
FIG. 7 is a plot of fluid displacement data, according to one or more embodiments described herein.

The fluid displacement % using the previous Examples was measured over time and plotted. Specifically, the fluid displacement % for Comp. Ex. 1-3 710, Comp. Ex 1-4 712, Ex. 5-1c 714, Ex. 5-2c 716, Ex. 5-3c 718, Ex. 6-1 520, Ex. 6-2 522, and Ex. 6-3 524 are shown in FIG. 7. A summary of the overall fluid recovery % for each Example is summarized in Table 11.

TABLE 11

| Flowback Enhancer Fluid Mixture | Flowback Enhancer Composition | Particles | Fluid Recovery % |
|---|---|---|---|
| Comp. Ex. 1-3 | — | Snowtex ® | 37% |
| Comp. Ex. 1-4 | — | — | 10% |
| Ex. 5-1c | Ex. 3-1 | Snowtex ® | 77% |
| Ex. 5-2c | Ex. 3-2 | Snowtex ® | 34% |
| Ex. 5-3c | Ex. 3-3 | Snowtex ® | 81% |
| Ex. 6-1 | Ex. 3-1 | — | 49% |
| Ex. 6-2 | Ex. 3-2 | — | 34% |
| Ex. 6-3 | Ex. 3-3 | — | 28% |

As shown in FIG. 7 and Table 11, the greatest improvement of recovery % was observed by adding nanosilica (Snowtex®) to Ex. 3-3, (Ex. 5-3c).

Example 8 demonstrates that embodiments described herein may be used to increase a rate of fluid recovery.

Example 9. Gravity Drainage Fluid Recovery Using Flowback Enhancer Fluid Mixtures Fluid displacement % using flowback enhancer fluid mixtures was measured, according to the gravity drainage fluid recovery column test method described previously using a 40/70 me0sh sand filled column. The experiments were performed using 6 wt. % KCl (Comp. Ex. 1-4), 6 wt. % KCl with 10 vol. % Snowtex® solution, flowback enhancer fluid mixtures with Snowtex® (Examples 5-1c, 5-2c, and 5-3c), and flowback enhancer fluid mixtures without particles (Examples 6-1, 6-2, and 6-3).

Figure 8:
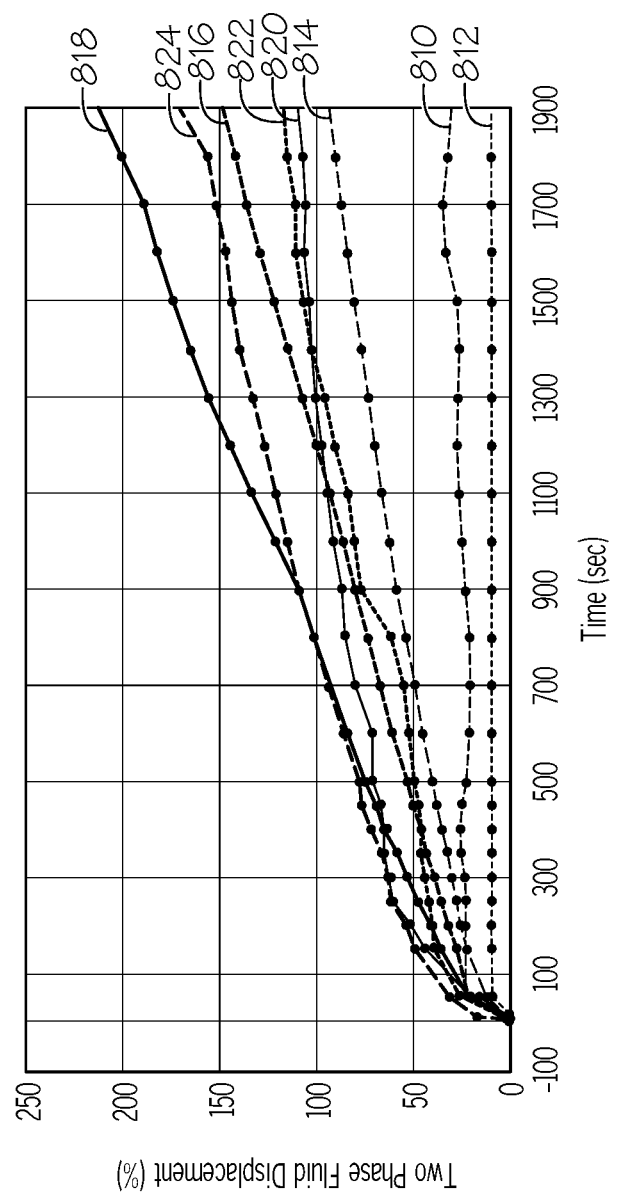
FIG. 8 is a plot of fluid displacement data, according to one or more embodiments described herein.

FIG. 8 shows the spectra demonstrating two phase fluid displacement % over time for each example. Specifically, spectra of Comp. Ex. 1-4 810, 6 wt. % KCL with 10 vol. % Snowtex® 812, Ex. 5-1c 814, Ex. 5-2c 816, Ex. 5-3c 818, Ex. 6-1 820, Ex. 6-2 822, and Ex. 6-3 824 are shown in FIG. 8.

The oil breakthrough time, aqueous fluid displacement at oil break in wt. %, and total displaced fluid after 1900 sec. for Example 9 is summarized in Table 12.

TABLE 12

| | Comp. Ex. 1-4 | 6 wt. % KCl with 10% vol. Snowtex ® | Ex. 5-1c | Ex. 5-2c | Ex. 5-3c | Ex. 6-1 | Ex. 6-2 | Ex. 6-3 |
|---|---|---|---|---|---|---|---|---|
| Oil Breakthrough time (sec) | No break | No break | 200 | 160 | 110 | 1500 | 1100 | 300 |
| Aqueous Fluid displacement at oil break (wt. %) | NA | NA | 24 | 27 | 35 | 104 | 83 | 63 |

TABLE 12-continued

| | Comp. Ex. 1-4 | 6 wt. % KCl with 10% vol. Snowtex® | Ex. 5-1c | Ex. 5-2c | Ex. 5-3c | Ex. 6-1 | Ex. 6-2 | Ex. 6-3 |
|---|---|---|---|---|---|---|---|---|
| Total displaced fluid in 1900 sec. (wt. %) | 30 | 9.6 | 93 | 148 | 213 | 109 | 116 | 170 |

As seen in FIG. 8 and Table 12, fluid displacement with oil from the gravity drainage fluid recovery test increased with addition of Snowtex®. When 6% KCl was displaced with oil only 30% of aqueous fluid is displaced in the experimental time of 1900 sec (Comp. Ex 1-4). However, using embodiments described herein, the displaced total fluid increases.

Further, when Ex. 3-1 is used without Snowtex® (Ex. 6-1), oil breakthrough occurred in 1500 sec. Adding Snowtex® to Ex. 3-1 (Ex. 5-1c) resulted in a significantly faster oil breakthrough time of 200 sec. Embodiments described herein may increase fluid flowback recovery and may improve enhanced oil recovery operations.

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A flowback enhancer composition comprising:
 a solvent mixture comprising an aqueous solution, at least methyl-9-dodecenoate, and at least isopropanol;
 a surfactant mixture comprising at least dodecylbenzene sulfonic acid and a castor oil ethoxylate; and
 one or more particles having a widest length of from 1 nanometer to 200 nanometers.

2. The composition of claim 1, wherein the solvent mixture further comprises methanol, ethanol, butanol, n-hexanol, ethylene glycol, propylene glycol, polyethylene glycol, triethylene glycol, diethylene glycol monomethyl ether, 2-ethylhexanol, or combinations thereof.

3. The composition of claim 1, wherein the surfactant mixture further comprises at least one modified quaternary imidazoline.

4. The composition of claim 1, wherein the surfactant mixture further comprises at least one poloxamer, wherein the poloxamer comprises a compound:

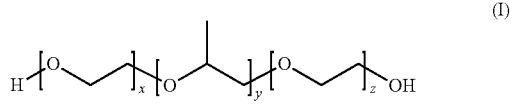

(I)

wherein x and z are each independently an integer from 2 to 130, and y is an integer from 15 to 67.

5. The composition of claim 1, wherein the one or more particles having a widest length of from 1 nanometer to 200 nanometers comprise silica, alumina, zirconia, clay, carbon, single-wall nanotubes, nanodiamonds, layered magnesium silicate, or combinations thereof.

6. The composition of claim 1, wherein the one or more particles having a widest length of from 1 nanometer to 200 nanometers is layered magnesium silicates comprising:
a first silicate layer;
a layer comprising magnesium; and
a second silicate layer;
where the layer comprising magnesium is positioned between the first silicate layer and the second silicate layer.

7. The composition of claim 1, wherein the flowback enhancer composition comprises from 2 weight percent to 30 weight percent of the one or more particles having a widest length of from 1 nanometer to 200 nanometers.

8. A method of hydraulic fracturing, the method comprising:
passing a fracturing fluid through a wellbore into a subterranean formation, wherein the fracturing fluid comprises a flowback enhancer composition in an amount of from 0.10 gallon per 1000 gallons of fluid (gpt) to 10 gpt based on the total volume of fracturing fluid;
hydraulically fracturing the subterranean formation with the fracturing fluid, thereby generating fractures in the subterranean formation;
passing the fracturing fluid to a surface of the well, wherein the fracturing fluid is mixed with hydrocarbons; and
at least partially separating the fracturing fluid from the hydrocarbons to yield a recovered fracturing fluid;
wherein the flowback enhancer composition comprises:
a solvent mixture comprising an aqueous solution, at least methyl-9-dodecenoate, and at least isopropanol;
a surfactant mixture comprising at least dodecylbenzene sulfonic acid and a castor oil ethoxylate; and
one or more particles having a widest length of from 1 nanometer to 200 nanometers.

9. The method of claim 8, wherein passing the fracturing fluid through the wellbore into a subterranean formation comprises adding the flowback enhancer composition to the fracturing fluid flowing from a pump to the wellbore.

10. The method of claim 8, wherein the surfactant mixture further comprises at least one modified quaternary imidazoline.

11. The method of claim 8, wherein the surfactant mixture further comprises at least one poloxamer, wherein the poloxamer comprises a compound of formula (I):

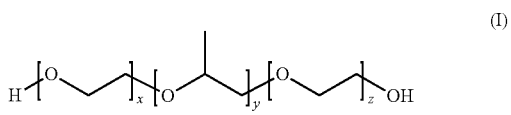

(I)

wherein x and z are each independently an integer from 2 to 130, and y is an integer from 15 to 67.

12. The method of claim 8, wherein the one or more particles having a widest length of from 1 nanometer to 200 nanometers comprise silica, alumina, zirconia, clay, carbon, single-wall nanotubes, nanodiamonds, layered magnesium silicate, or combinations thereof.

13. The method of claim 8, wherein the one or more particles having a widest length of from 1 nanometer to 200 nanometers is layered magnesium silicates comprising:
a first silicate layer;
a layer comprising magnesium; and
a second silicate layer;
where the layer comprising magnesium is positioned between the first silicate layer and the second silicate layer.

14. The method of claim 8, further comprising passing a hydrocarbon stream in the subterranean formation to the surface of the well.

15. The method of claim 14, wherein the flowback enhancer composition increases a rate of production of the hydrocarbon stream.

* * * * *